United States Patent [19]

Hayes et al.

[11] Patent Number: 5,054,268
[45] Date of Patent: Oct. 8, 1991

[54] PRESS ON, SCREW TIGHT MEANS FOR APPLYING A CLOSURE

[75] Inventors: Thomas H. Hayes; Charles S. Ochs, both of Lancaster; Carl E. Koontz, Thornville, all of Ohio

[73] Assignee: Anchor Hocking Packaging Company, Lancaster, Ohio

[21] Appl. No.: 568,591

[22] Filed: Aug. 16, 1990

Related U.S. Application Data

[63] Continuation-in-part of Ser. No. 401,966, Sep. 1, 1989, Pat. No. 4,978,016.

[51] Int. Cl.$^5$ ............................. B67B 3/20; B65B 7/28
[52] U.S. Cl. ........................................... 53/490; 53/367
[58] Field of Search ............... 53/485, 490, 317, 331.5, 53/367, 329, 314, 315

[56] References Cited

U.S. PATENT DOCUMENTS

| | | | |
|---|---|---|---|
| 2,658,654 | 11/1953 | Schweizer | 53/314 X |
| 3,968,823 | 7/1976 | Simon | 53/485 X |
| 4,156,490 | 5/1979 | Peraboni | 53/490 X |
| 4,196,818 | 4/1980 | Brownbill | 53/485 X |
| 4,506,795 | 3/1985 | Herr . | |
| 4,643,321 | 2/1987 | Gach | 53/490 X |
| 4,691,501 | 9/1987 | King | 53/485 |
| 4,846,361 | 7/1989 | Haffner | 53/490 X |

Primary Examiner—Horace M. Culver
Attorney, Agent, or Firm—Wood, Herron & Evans

[57] ABSTRACT

Inadvertent rupture of frangible tamper evidencing means during application of threaded closures is reduced by axially pressing the closure partially onto the container, without rotating the closure, until a downwardly tapered retaining means on the closure is engaged by an upwardly tapered locking rib around the container finish. This engagement centers and positions the closure so that the axis of the closure is aligned with the container axis. The closure is held in alignment to prevent cocking or misengagement of the threads until the closure is thereafter turned to tighten it on the container.

10 Claims, 2 Drawing Sheets

PRESS ON, SCREW TIGHT MEANS FOR APPLYING A CLOSURE

RELATED APPLICATIONS

This application is a continuation-in-part of co-pending application Ser. No. 401,966, filed Sept. 1, 1989, titled "Tamper Indicating Closure Having Retaining Hoop With Relief Windows", now U.S. Pat. No. 4,978,016.

FIELD OF THE INVENTION

This invention relates to threaded closures of the type having rupturable tamper evidencing means, and more particularly to the securing of such closures on containers.

BACKGROUND OF THE INVENTION

Conventionally, when threaded closures are to be secured onto containers on a sealing line, a closure is placed atop a container and is turned to mechanically engage its threading with that of the container. Turning is continued to draw the closure down on the container to a fully tightened secured position. However, if the closure threading is not properly aligned or "started" with respect to the threading of the container when rotation is commenced, the threads can strip or the closure can cock on the container so severely that the closure cannot be tightened without damaging it. The problem of misalignment arises because the threads are helical or tilted with respect to the vertical center axis of the container; when the lower ends of the closure thread or threads just engage the upper ends of the container threads the helical angulation initially tends to cock or tilt the closure so that the axis of the closure is misaligned or skewed with respect to the axis of the container. If the closure is turned while in such cocked position it might or might not align itself, depending upon its rotational position, the extent of misalignment, the clearance between the threads, and other factors; but progressive tightening can strip the threads or jam or even split the closure. In a closure applying line running at hundreds of containers per minute, misalignment can seriously slow the rate. Thus it is very important, as a practical matter, that closure misalignment be minimized and that every closure be started on its respective container with its central axis in line with that of the container.

Some prior art closures have been pushed axially part way onto the threads of containers before being turned; the closure elastically flexes radially so that its threads can slip past the upper part of the container threads. This reduces the amount of angular turning that is required to fully secure the closure. However, the closures were susceptible to being pressed on too far, which made removal difficult, especially if the closure was applied hot. Moreover, those closures had no tamper evidencing means.

The problems caused by closure misalignment become more serious if the closure has frangible (rupturable) tamper indicating means around it. Such tamper indicating means may for example be in the form of a band separably attached to the lower edge of the closure skirt, having retaining means that positively engages below a locking rib or bead on the container. The retaining means engages (as by snapping) below the locking rib when the closure is applied. One example of such tamper indicating means is shown in U.S. Patent application Ser. No. 401,966, previously referred to, to which reference may be had. When the closure is unscrewed to remove it from the container, the retaining means abuts the locking rib which then blocks further upward movement, thereby rupturing frangible bridges or perforations between the tamper indicating band and the closure skirt. The separation (which may be either partial or total) of the tamper indicating means from the upper part of the closure is visually apparent and provides an indication that tampering has occurred.

Because the tamper indicating means is frangibly attached to the rest of the closure, it can rupture prematurely if the closure is tightened on the container while in a misaligned position. If the closure is canted on the container, its effective cross section (in a plane perpendicular to the container axis) is elliptical rather than circular. As a result of this the retaining means is stressed nonuniformly when it engages the locking rib; the stress is greater along the wider axis of the ellipse (where the end curvature is tighter) and can cause the tamper indicating means to separate from the closure even though the closure may later align and the threads properly engage. Thus it is especially important that a threaded closure having tamper indicating means be properly aligned on the container when it is tightened to secure it in place.

SUMMARY OF THE INVENTION

This invention provides a method and structure for applying threaded tamper indicating closures whereby the tamper indicting means itself assists in properly orienting the closure on the container so that the respective axes of the closure and container are placed in alignment before the closure is turned to secure it. The closure has a skirt with an internal thread which is interengageable with an external thread on a container finish. The skirt has tamper indicating means in the form of an annular band which is frangibly attached below the lower end of the skirt. Retaining means projects upwardly and inwardly from the band and, as the closure is being secured, the retaining means snaps or hooks below a locking rib around the container. The retaining means, or "retainer," has a downwardly facing lower surface which is tapered or approximately conical, preferably in the form of an inwardly and upwardly tapering hoop. As the closure is applied, the retainer first snaps over the container threads, then engages a tapered, upwardly facing, aligning surface on the locking rib. If the closure is cocked, the retainer makes contact with the rib upper surface at only a single point, and this "rocks" or cams the retainer to center itself and thereby brings the closure axis into alignment with the container axis so that the closure is level on the finish. The retainer engages the locking rib rather like a funnel sitting on a funnel, which aligns the closure properly on the container. As the closure is further tightened the retainer is flexibly expanded to pass over the locking rib and snap in below it.

In the method of the invention the closure is secured on a sealing line by first applying downward force to it, in a direction parallel to its axis. This force presses the closure downward and snaps the retainer over the container threading, to that position in which the retainer engages the locking rib upper surface. The pressing force can be applied by a closure press-on wheel, platen, belt or other means acting downwardly on the closure. The closure is pushed but is not rotated during this initial step. The retainer is pushed past the threading of the container; indeed, the closure threads may even be pressed past the upper ends of the container threads. That is to say, the threads may be partially engaged by the pushing. The closure is thus pressed down axially until the retaining means engages the upper surface of the locking rib, thereby aligning the closure. The closure is thus constrained downwardly by the pressing means and/or the container threads, while the locking rib urges it upwardly. This constraint holds the closure aligned until it is turned. Turning is carried out by opposed belts or friction surfaces and tightens the closure to a desired torque. The correct alignment of the closure and container axes prior to the start of turning assures that the closure does not jam during turning and thus that the tamper indicating band will not be broken by cocking.

DESCRIPTION OF THE DRAWINGS

The invention can best be further described by reference to the accompanying drawings, in which.

DETAILED DESCRIPTION

Figure 1:
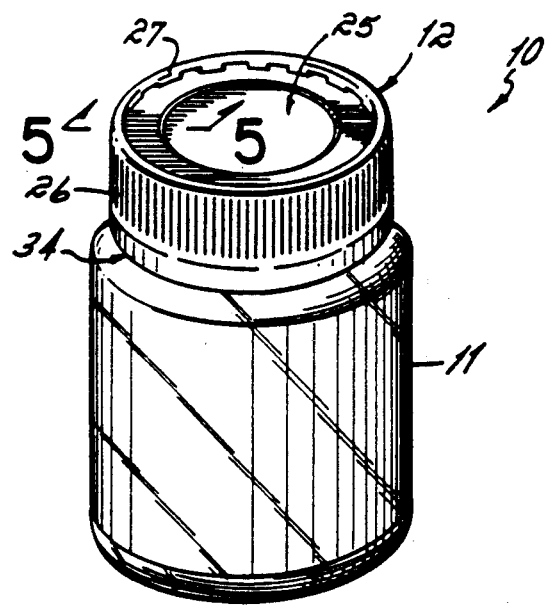
FIG. 1 is a perspective view of a package comprising a preferred form of closure and container in accordance with the invention.
Figure 2:
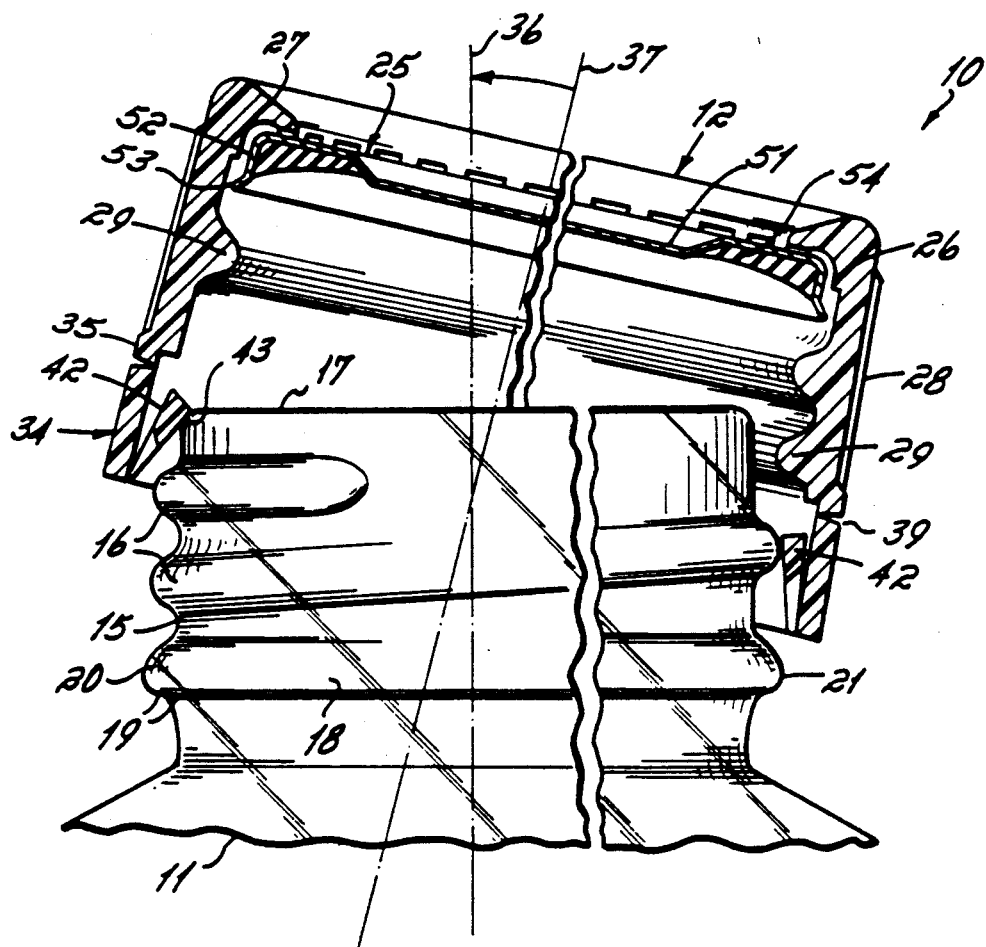
FIG. 2 is an enlarged fragmentary axial section of a closure and a container in accordance with the invention, with the closure misaligned on the top of the container, prior to pressing.

The package 10 shown in FIG. 1 comprises a container 11 and a closure 12. Container 11 has an upper or finish portion 15 with one or more external threads 16 and a sealing rim 17 at the top and/or side. Below threads 16 the finish 15 has an annular locking rib or bead 18 with a locking surface 19 on its lower side and a tapered, upwardly facing aligning surface 20 (FIG. 2). In the embodiment shown closure 12 is a composite closure having a separately formed top or insert disk 25 which is received by and carried within a surrounding shell 26. Shell 26 comprises a top lip 27 which overlaps the edge of insert disk 25, and a cylindrical skirt 28 having one or more internal threads 29 which cooperate with the external threading 16 of container 11. Threads 16, 29 can be single start (continuous) or multiple start (discontinuous) threads, and the term "thread" as used herein is meant to include both types. Single start threading is shown in the drawings.

In the embodiment shown disk 25 has a top surface 51 and a peripheral downturned flange 52 with a lower edge 53. A gasket 54 or liner is seated on or adhered to the underside of disk 25 to form a seal with the container rim 17. It should be understood that the invention is also useful with integrally formed closures, i.e., closures wherein the top is an integral panel rather than a separately formed insert disk.

Closure 12 has tamper evidencing means preferably in the form of a band 34 which is frangibly attached around a lower edge 35 of skirt 28. In the embodiment shown, tamper evidencing band 34 is connected to skirt 28 for example by small rupturable bridges 38 along a perforated score line 39 between the band and the skirt. Tamper evidencing means 34 includes retaining means 42 which is hinged to and extends upwardly and inwardly from its lower edge. In secured position (shown in FIG. 5) retainer 42 engages under surface 19 of locking rib 18. Retaining means 42 is preferably a band retaining hoop of the type disclosed in previously identified application Ser. No. 401,966, the disclosure of which is incorporated herein by reference. The hoop has a larger diameter where it joins band 34, than along its distal edge 45, and thus presents a tapered downwardly facing aligning surface 43. It approximates a truncated cone although the cone is not necessarily smooth or continuous around its periphery (the hoop disclosed in application No. 401,966 is slightly polygonal as viewed in plan, rather than circular). The retainer can include a seating "ledge" around it, but that is not preferred. The downwardly and outwardly tapered (rounded), upwardly facing alignment surface 20 of rib 18 engages the aligning surface 43 of retainer 42, similar to the way that one funnel aligns another placed inside it. Because retainer 42 is peripherally connected to band 34, it acts as a rather stiff conical spring; if flexed outwardly it exerts an inward force, which assists the centering or leveling effect. The slopes of aligning surfaces 20, 43 meet around an annular band of contact 43 (see FIGS. 3 and 4).

In carrying out the method of the invention, the closure is first positioned atop the container, for example by closure applying means of the type disclosed in the copending application of James M. Herzog, Ser. No. 07/538,026, filed June 13, 1990, to which reference may be had. Desirably, closures should be positioned atop the containers with their axes properly aligned to start with, but that does not always happen, and if a closure is misaligned when first placed on the container (FIG. 2) and rotation were started to tighten the closure, jamming could occur.

To correct any such initial misalignment the closure 12 is first pushed on part way and is aligned before rotation starts. Typically this is done in a sealing line; as a practical matter the rates and forces required are greater than can be done manually. The closure can be pushed downward as by a carrier, shoe, belt or platen 57 (referred to as "pressing means"). The pressing means is advanced by pushing means such as a hydraulic piston (not shown) and is advanced without axial rotation until band retainer 42 engages upwardly facing aligning surface 20 of locking rib 18. As this occurs the locking rib 18 centers or aligns the retainer (if cocked) so that center axis 37 of the closure is brought parallel to and coincidental with the center axis 36 (FIG. 2) of the container thereby aligning the closure on the container.

Retainer 42 flexes elastically and acts as a spring when it engages rib 18. This puts the smaller diameter distal edge 45 in tension. As this occurs, the spring-like retainer tends to center or align the closure 12 on the container, and thereby corrects any cocking which might have existed.

Closure alignment occurs after the retainer has been snapped below the lower end of container thread 16

Figure 3:
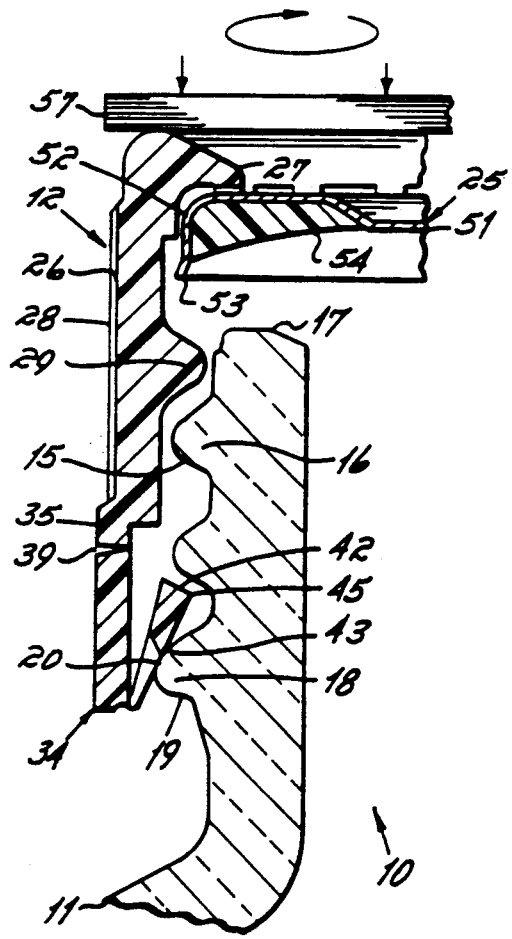
FIG. 3 is an enlarged partial vertical section of the closure and container in a press-on apparatus, shown diagrammatically, for carrying out the method of the invention, and shows the closure after it has been pressed partially onto the container and the retainer has been engaged with and aligned by the locking rib, before rotation has started.

(FIG. 3). Closure thread 29 may still be spaced slightly above container thread 16, that is, the threads may not yet be engaged; or, depending on closure orientation and the depth of pressing, the closure thread 29 may actually have passed the upper end of external thread 16 of the container. As noted, the closure is somewhat flexible, and the overlap of the internal and external threads is not so great as to cause splitting or permanent deformation as the closure is pressed on. Thus, closure 12 is pushed downwardly onto the container at least to the position illustrated in FIG. 3, in which band retainer 42 has snapped beneath external thread 16 but the threads 16 and 29 have not been interengaged, and optionally to the FIG. 4 position in which internal thread 29 is below the upper end of external thread 16. In either case band retainer 42 is engaged by and centered on locking rib 18. In the latter position the hoop has been deflected outwardly so far that it is almost flat up against the inside wall of the tamper evidencing band, so that the hoop can pass rib 18.

It is important that the closure not be rotated simultaneously as it is being pushed onto the container, until it has been pushed at least to the FIG. 3 position. Once pushed down, the closure can be held down until engaged for turning by pressing means 57 and/or by engagement of retainer 42 below the lower end of external thread 16. The engagement of the retainer on the locking rib constrains it from below. Thus trapped both above and below, the aligned closure is prevented from cocking until it is turned.

Figure 4:
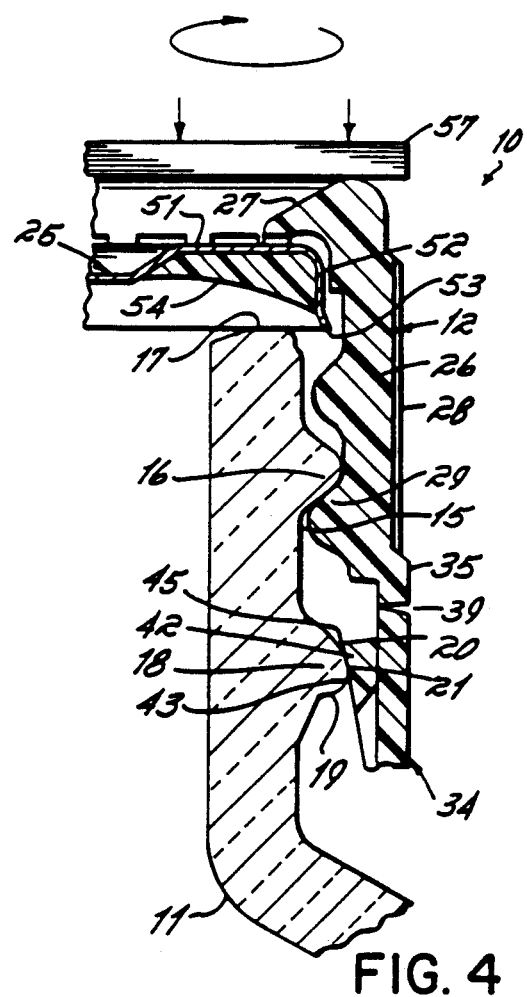
FIG. 4 is a section similar to FIG. 3 but shows the closure having been pushed down farther than in FIG. 3, in accordance with a modified form of the method of the invention.
Figure 5:
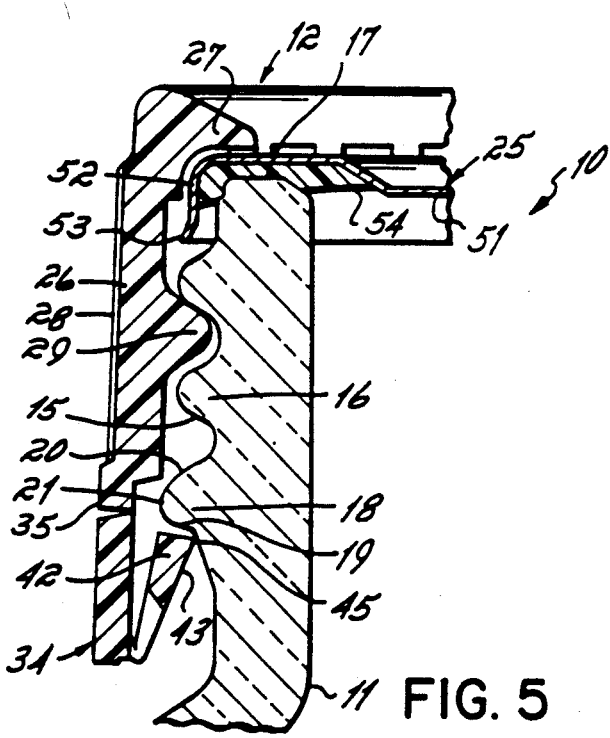
FIG. 5 is an enlarged axial section taken on line 5—5 of FIG. 1, showing the closure after it has been rotated to tighten it on the container.

The closure can then be turned to engage the threads if not already engaged (FIG. 3) or to complete the tightening if they are already engaged (FIG. 4). The turning movement can be applied by known means, for example opposed driven belts as shown in Ochs U.S. Pat. No. 4,199,914, titled "Sealing Machine Closure Cap Pickup." If the threads are not yet engaged they engage properly when the closure is rotated.

As the closure is turned internal thread 29 moves beneath the upper or leading end of the external thread 16, drawing the closure downward on the external threads. After distal edge 45 of band retainer 42 has passed below the locking rib 18 (FIG. 5), the hoop stress on it snaps it inwardly beneath the rib lower surface 19. With retainer 42 now locked beneath rib 18, tightening continues to a desired torque. Thereafter, when closure 12 is rotated in the opposite direction to open package 10, locking means 42 engages rib 18 and the strain increases until bridges 38 shear so that tamper evidencing band 34 partially or wholly separates from the closure skirt, thereby displaying evidencing of the opening.

Although not shown in the drawings, it is contemplated that closure 12 may optionally include an annular rib on its inside surface, above or at the top of the internal threads 29, to engage the lower edge 53 of disk 25 and lift the disk when the closure is being removed to break the vacuum, after the tamper evidencing band has been ruptured. A preferred form of such ribs is shown in copending application Ser. No. 07/535,756, filed June 8, 1990, titled "Low Height Floating Disk Closure now U.S. Pat. No. 5,031,787." The closure preferably also includes water washing slots and/or pressure venting means, but they are not a part of the invention.

Having described the invention, what is claimed is:

1. In the method of securing plastic closures on containers on a sealing line wherein the closure is turned to tighten an internal thread of the closure on an external thread of the container and a retaining means of a rupturable tamperevidencing means of the closure is engaged inwardly below a locking rib on the container, the improvement comprising, positioning the closure at the top of the container, pressing the closure relatively downwardly partway onto the container, without relative turning movement, while moving said container and closure along said sealing line, until a tapered downwardly facing aligning surface of said retaining means has been moved downwardly past the thread of the container and has been brought into engagement with a tapered upwardly facing aligning surface of said container, such engagement of the aligning surfaces aligning the center axis of said closure with the center axis of said container, constraining the closure against disalignment of the said axes, until turning has commenced, under a surface which bears downwardly on the top of said closure, and turning said closure while so aligned on said container until said threads have drawn said retaining means below said locking rib and the closure is tight on the container.

2. The improvement of claim 1 wherein said closure is held with its said center axis so aligned, after said pressing and until said turning has commenced, by engagement of said retaining means under the lower end of said external thread.

3. The improvement of claim 1 wherein said pressing is carried out by applying a downward force to the top of said closure.

4. The improvement of claim 3 further wherein said downward force is applied by relative downward movement of a surface which bears on the top of said closure.

5. The improvement of claim 1 wherein, as said closure is pressed onto said container, said internal thread of the closure is moved axially past at least the upper end of said external thread of the container, said closure flexing elastically to permit the threads to pass.

6. The improvement of claim 5 wherein said retaining means yields outwardly to pass the external thread of the container during said pressing.

7. The improvement of claim 1 wherein said closure is maintained in such alignment on said container by continuing said pressing of said closure while commencing to turn said closure.

8. In the method of securing plastic closures onto containers on a sealing line, wherein a closure is turned to tighten an internal thread of the closure on an external thread of the container and a flexible retaining means of a rupturable tamper-evidencing means of the closure is thereby advanced downwardly past a locking rib of the container to engage inwardly below said rib, the improvement comprising, providing a closure having a downwardly facing tapered aligning surface on said retaining means, providing a container having an upwardly facing tapered aligning surface on said locking rib which engages said downwardly facing aligning surface of said retaining means as the closure is moved downwardly on the container, partially securing the closure on the container without turning it, by applying axial force to the closure to press it onto the container until said retaining means has been pushed below the external thread of said container and is engaged with said upwardly facing aligning surface of said rib, said rib centering said retaining means on it and thereby aligning the axis of said closure with the axis of said container, constraining the closure against disalignment of said axes, until turning has commenced, under a surface which bears downwardly on the top of said closure, and when said closure has been so aligned, turning said closure until said retaining means has been engaged inwardly below said locking rib and said closure is tight on the container.

9. The improvement of claim 8 including the further step of maintaining such alignment by applying hold down force on said closure until said threads have been engaged by turning.

10. The improvement of claim 8 including the further step of maintaining such alignment by engaging said retaining means below the lower end of said external thread, until said threads have been engaged by turning.

* * * * *